United States Patent [19]

Scarnera et al.

[11] Patent Number: 4,765,306
[45] Date of Patent: Aug. 23, 1988

[54] COMBUSTION ENGINE STROKE IDENTIFICATION SYSTEM

[75] Inventors: Michele Scarnera, Monzuno; Carlo Conticelli, Bologna, both of Italy

[73] Assignee: Weber S.p.A., Turin, Italy

[21] Appl. No.: 870,454

[22] Filed: Jun. 4, 1986

[30] Foreign Application Priority Data

Jun. 4, 1985 [IT] Italy ................ 67512 A/85

[51] Int. Cl.⁴ ............................................. F02P 5/04
[52] U.S. Cl. ................................... 123/643; 123/612; 123/617; 123/414
[58] Field of Search .............. 123/414, 416, 424, 612, 123/617, 618, 643

[56] References Cited

U.S. PATENT DOCUMENTS

| | | | |
|---|---|---|---|
| 4,414,946 | 11/1983 | Daumer | 123/414 |
| 4,489,691 | 12/1984 | Ono | 123/424 |
| 4,494,509 | 1/1985 | Long | 123/414 |
| 4,553,427 | 11/1985 | Kuraoka | 123/414 |
| 4,570,594 | 2/1986 | Egami | 123/414 |
| 4,615,318 | 10/1986 | Imoto | 123/414 |

Primary Examiner—Ronald B. Cox
Attorney, Agent, or Firm—Gifford, Groh, VanOphem, Sheridan, Sprinkle and Dolgorukov

[57] ABSTRACT

A system for stroke identification of an internal combustion engine, comprising first sensor means for detecting given angles of a drive shaft; second sensor means for detecting given angles of a distributor shaft; third processing means for receiving signals from the first and second sensor means and for identifying the strokes on the engine; and on which the aforementioned second sensor means comprise a single sensor element.

15 Claims, 3 Drawing Sheets

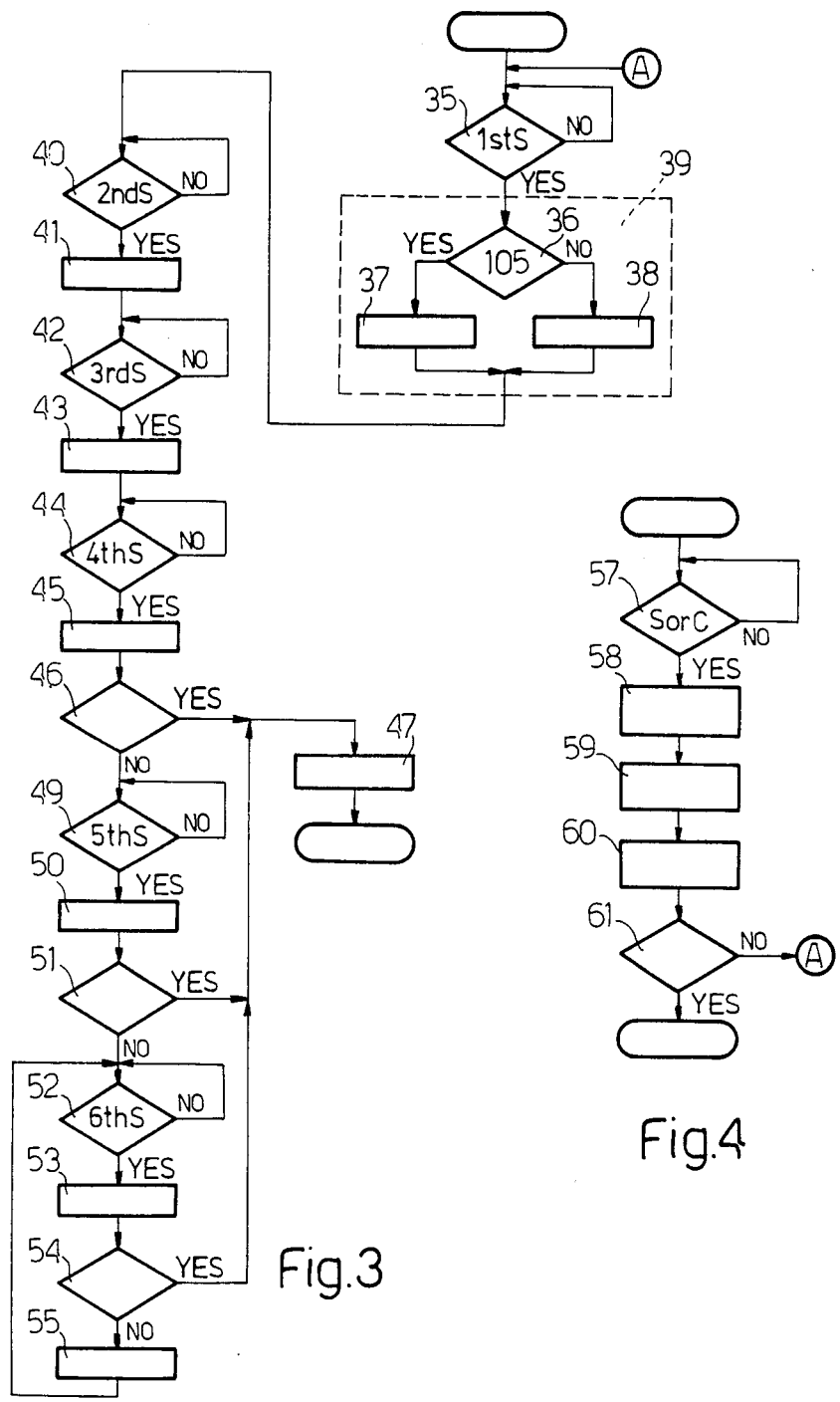

COMBUSTION ENGINE STROKE IDENTIFICATION SYSTEM

BACKGROUND OF THE INVENTION

The present invention relates to an internal combustion engine stroke identification system, particularly for application on a sequential, timed electronic injection system.

Electronic injection systems on internal combustion engines are known to present an electronic control system which, depending on the signals received from various sensors (mainly engine speed/stroke and intake air pressure/temperature sensors), determines, for example, air density inside the manifold and engine speed, and calculates, via interpolation on respective memorised maps, the stroke and timing for injecting fuel into the injectors, as well as the spark lead. Provision may be made for one injector per cylinder, located downstream from the throttle valve, or for a single injector located up- or downstream from the throttle valve. Such a sequential, timed electronic injection system therefore employs a given number of angular references on the drive and distributor shafts, for enabling the control system to determine the stroke (induction, compression, expansion, exhaust) of each cylinder. Each half revolution of the engine, the control system is therefore able to open the specific injector relative to the cylinder performing the required stroke. The engine strokes, however, must be identified by the control system within the shortest possible time after starting, for enabling correct fuel supply as soon as the engine is started up.

Use is generally made of a first sensor facing a pulley angularly integral with the drive shaft, the said pulley having four projecting teeth equally spaced at 90° intervals, and a pair of sensors facing a cam secured angularly to the distribution shaft, which cam presents a pair of teeth spaced 90° apart. The said pair of sensors, however, presents a number of drawbacks, due to possible interference between the respective magnetic circuits, particularly if the system is fitted onto existing distributors not specifically designed for the purpose, thus resulting in interference signals and false signaling of the said sensors.

SUMMARY OF THE INVENTION

The aim of the present invention is to provide an internal combustion engine stroke identification system designed to overcome the aforementioned drawbacks, i.e. a system providng for substantially eliminating any possibility of false signaling, for lower production cost combined with greater reliability, and for minimising stroke identification time.

With this aim in view, according to the present invention, there is provided a system for identifying the strokes on an internal combustion engine, said system comprising first sensor means for detecting given angles of a drive shaft, second sensor means for detecting given angles of a distributor shaft, and third processing means for receiving signals from the said first and said second sensor means, and for identifying the strokes on the said engine, characterised by the fact that the said second sensor means comprise a single sensor element.

BRIEF DESCRIPTION OF THE DRAWINGS

One embodiment of the present invention will now be described, by way of a non-limiting example, with reference to the accompanying drawings, in which:

FIGS. 3 and 4 show operating block diagrams of the identification system according to the present invention;

DETAILED DESCRIPTION OF THE INVENTION

Figure 1:
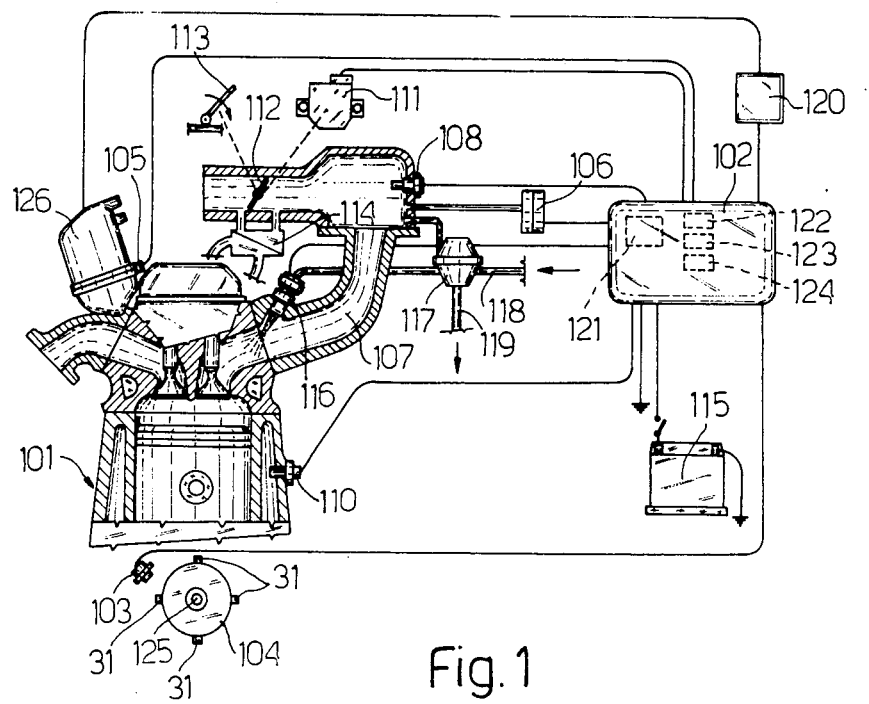
FIG. 1 shows a schematic view of an electronic injection system for an internal combustion engine, with the engine stroke identification system according to the present invention.

FIG. 1 shows a schematic view of an electronic injection system for an internal combustion engine 101, conveniently a four-cylinder engine, illustrated partially in cross section. The said system comprises an electronic control system 102 comprising, in substantially known manner, a microprocessor 121 and memorized in which are memorised maps relative to various operating conditions of engine 101. The said control system 102 also comprises a counter 122, an updatable memory register 123, and an addressablecell memory register 124 the operation of which is described later on. The said control system 102 receives signals from :

a sensor 103 for detecting the speed of engine 101 and located opposite a pulley 104 on drive shaft 125;

a sensor 105 for detecting the stroke of engine 101 and located inside a distributor 126 as detailed later on;

a sensor 106 for detecting the absolute pressure inside induction manifold 107 on engine 101;

a sensor 108 for detecting the air temperature inside manifold 107;

a sensor 110 for detecting the water temperature inside the cooling jacket on engine 101;

a sensor 111, substantially consisting of a potentiometer, for detecting the setting of a throttle valve 112 located inside induction manifold 107 and controlled by accelerator pedal 113; parallel with the said throttle valve 112, there is provided an additional air intake valve 114.

Figure 2:
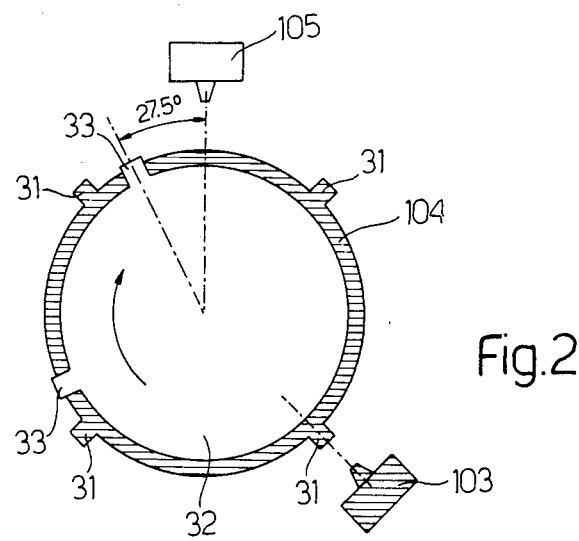
FIG. 2 shows a schematic view of a number of component elements on the FIG. 1 system.

The said electronic control system 102 is connected to an electrical supply battery 115 and grounded, and, depending on the signals received from the aforementioned sensors, engine speed and air density are employed for determining fuel supply according to the required mixture strength. The said control system 102 therefore controls the opening time of electroinjectors 116 located inside manifold 107 next to the intake valve of each respective cylinder, so as to control the amount of fuel supplied to the various cylinders on engine 101, and also controls injection timing for commencing fuel supply according to the strokes (induction, compression, expansion, exhaust) of engine 101. The said electroinjector 116 is supplied with fuel via a pressure regulator 117 sensitive to the pressure inside induction manifold 107 and having a fuel intake pipe 118 from a pump (not shown) and a return pipe 119 to a tank (not shown). Electronic control system 102 is also connected to an ignition pulse control unit 120. As shown in FIG. 2, pulley 104 presents four projecting teeth 31 equally spaced at 90° intervals, sensor 103 being arranged facing the passage of the said teeth 31 and at such an angle as to detect passage of the same at +10° and +100° respectively in relation to the top dead centre of each cylinder. The sequence of signals (S) supplied by the said sensor 103 during rotation of drive shaft 125 is shown in FIG. 5a. Also as shown in FIG. 2, sensor 105 is arranged facing a disc 32 secured angularly to the shaft of distributor 126 and having two projecting teeth 33 spaced 90° apart. In more detail, the said sensor 105 is located in the distributor portion relative to cylinder 3 and at such an angle that, when a tooth 31 is arranged facing speed sensor 103, the first tooth 33 on disc 32 lags by 27.5° in relation to the axis of sensor 105. FIG. 5b shows the sequence of signals (C) supplied by sensor 105, which, for each complete cycle of engine 101, presents a first signal lagging by 55° in relation to the foregoing signal from sensor 103, and, in the example shown, leading by 135° in relation to the top dead centre of cylinder 3 (indicated by $P_3$ in FIG. 5d in which $P_1$, $P_4$ and $P_2$ indicate the top dead centres of the other cylinders 1, 4 and 2). The second signal supplied by sensor 105, when the second tooth 33 passes in front of it, leads by 135° in relation to the top dead centre ($P_4$) of cylinder 4, and lags by 180° in relation to the first signal from sensor 105, by virtue of each full turn of disc 32 corresponding to two turns of drive shaft 125 and, consequently, of pulley 104.

Figure 5:
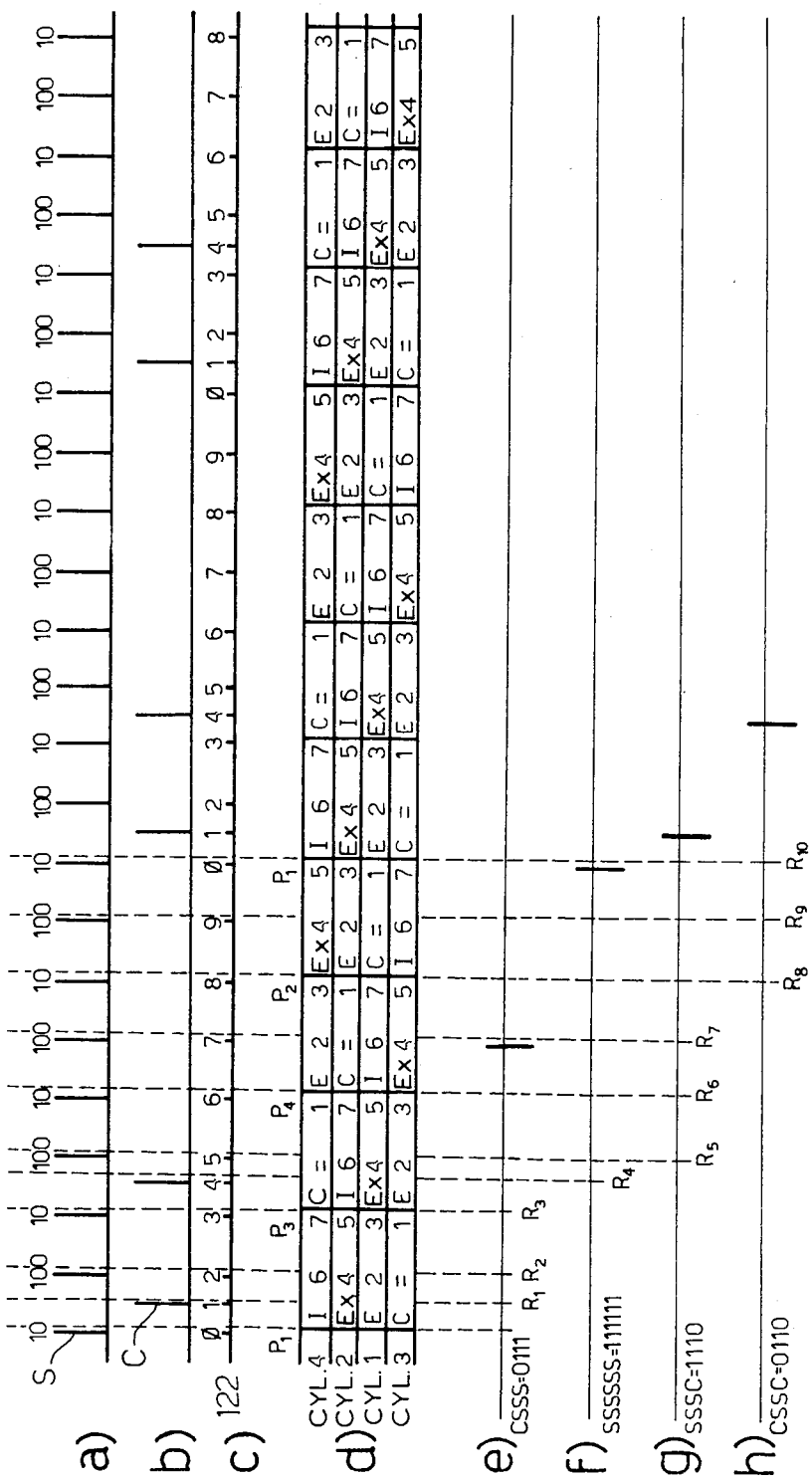
FIG. 5 shows a schematic diagram of a number of signals on the identification system according to the present invention.

FIG. 5d shows, one on top of the other for cylinders 4, 2, 1 and 3 respectively, the stroke sequence of each cylinder as related to the angle sequence of the signals from sensor 103 shown in FIG. 5a. The letters I, C, E or Ex in each box indicate the induction, compression, expansion or exhaust stroke respectively of each cylinder. Operation of the system for stroke identification of engine 101, according to the present invention, will now be described with reference to FIG. 3. Via block 35, microprocessor 121 detects an incoming signal from sensor 103 or 105 (FIG. 5a or 5b respectively). Upon reception of one of the said signals, block 35 goes on to block 36 which determines whether the incoming signal is from sensor 105. If it is, block 36 goes on to block 37 which shifts one place leftwards the figures contained in a memory register, e.g. memory register 123, and enters a 0 in the extreme right-hand position. If the incoming signal is not from sensor 105, block 36 goes on to block 38 which shifts one place leftwards the figures contained in memory register 123 and enters a "1" in the extreme right-hand position. Blocks 36, 37 and 38 form part of an overall block 39 (shown by the dotted line in FIG. 3). Block 37 or 38 goes on to block 40 which detects a second incoming signal from sensor 103 or 105. When such occurs, block 40 goes on to block 41, which operates the same way as block 39, and, from there, to block 42 which detects a further incoming signal (i.e. the third) from sensor 103 or 105. Upon reception of the said signal, block 42 goes on to block 43, which operates the same way as block 39, and, from there, to block 44 which detects a further incoming signal (i.e. the fourth) from sensor 103 or 105. When such occurs, block 44 goes on to block 45, which operates the same way as block 39, and from there, to block 46 which determines whether the sequence of signals received and memorised in memory register 123 matches one of a number of given four-signal sequence. The said sequences are listed in the following Table 1, in which the letter S indicates the signals from sensor 103, and C the signals from sensor 105. Beside each sequence is indicated the content of register 123 and the number, from 0 to 9, to which counter 122 is preset by block 47, which is activated by positive identificaiton by block 46. Counter 122, the output sequence of which is shown in FIG. 5c, is moved forward one unit for each incoming signal from sensor 103 or 105, and has a maximum capacity ranging from 0 to 9. When the maximum count (9) is reached, the next signal from sensor 103 sends the counter, and also memory register 123, back to 0, in that the same signal cycle from sensors 103 and 105 and the same stroke cycle of engine 101 are repeated continually. The output from 0 to 9 of counter 122 thus indicates the strokes of engine 101, by informing the output switch, as shown in FIG. 5, of the intermediate or final status of each specific stroke of each cylinder. For example, when the output of counter 122 switches to 7, this means the cylinders on engine 101 are roughly halfway through:expansion (cylinder 4), compression (cylinder 2), induction (cylinder 1) and exhaust (cylinder 3). In more detail, microprocessor 121 receiving the output of counter 122 assigns, to each said output value, one of the numbers shown in FIG. 5d relative to the various cylinders on engine 101 and indicating the stroke status of the same. For example, with an output of 8 on counter 122, microprocessor 121 assigns a 3 to cylinder 4, a 1 to cylinder 2, a 7 to cylinder 1 and a 5 to cylinder 3, thus indicating that the said four cylinders are at the end of the expansion, compression, induction and exhaust stroke respectively. In like manner, fuel supply to injectors 116 and ignition by unit 120, as determined by respective maps stored in control unit 102, are performed at the required cylinder strokes, when the said numbers from 0 to 7 indicating the specific stroke status of each cylinder are supplied.

TABLE 1

| CSSC | 0110 | 4 |
| CSSS | 0111 | 7 |
| SSSC | 1110 | 1 |

If none of the said memorised sequences of signals from sensors 103 and 105 is detected by block 46, block 46 goes on to block 49, which detects the next incoming signal from sensor 103 or 105, and, from there, to block 50 which operates the same way as block 39. Block 50 then goes on to block 51 which, like block 46, detects the sequence of the last four signals received from sensors 103 and 105, the first signal detected by block 35 being discarded, and, if the said sequence matches one of those memorised and listed in Table 1, activates block 47, in the same way as block 46, so as to preset the output of counter 122 to the figure shown in Table 1 beside each identified sequence. In the case of negative identification by block 51, block 51 goes on to block 52 which detects reception of a further signal from sensor 103 or 105. If such is received, block 52 goes on to block 53 which, operating in the same way as block 39, goes on to block 54, which determines whether or not the incoming sequence matches one of the set four-signal sequences from sensors 103 and 105 listed in Table 1, or a sequence of six consecutive signals from sensor 103, which corresponds to counter 122 being preset to output 0, as shown in Table 2.

TABLE 2

| SSSSSS | 111111 | 0 |

Upon identification by block 54 of one of the Table 1 sequences or the Table 2 sequence, block 54 goes on to block 47. In the case of negative identification, block 54 goes on to block 55 which discards, from the sequence of signals memorised in register 123, the first signal detected by block 35, after which, it goes on to block 52 for detecting a further signal from sensor 103 or 105.

The type of sequence identified and, therefore, the time required for stroke identification of engine 101 depend on the starting angle of the engine. As shown in FIG. 5e, in the case of identification commencing after the first tooth 33 moves past sensor 105 (angle $R_1$), the first signal detected by block 35 (FIG. 3) is an S signal from sensor 103, whereas those detected by blocks 40, 42 and 44 are S, C and S signals. As block 46 does not identify the SSCS sequence, neither is the SCSS sequence identified by block 51, and only by block 54 is the CSSS sequence identified, corresponding to counter 122 being preset to output 7 as shown in FIG. 5. If, on the other hand, identification commences after tooth 31 has moved past sensor 103 ,(angle $R_2$), identification is performed by block 51 which detects the CSSS sequence and also, via block 47, causes counter 122 to be preset to output 7. If, on the other hand, identification commences from angle $R_3$, identification is performed by block 46 detecting the memorised CSSS sequence.

As shown in FIG. 5f, if identification commences from angle $R_4$, identification is performed by block 54 which detects the memorised sequence of six S signals and, via block 47, causes counter 122 to be preset to output 0.

As shown in FIG. 5g, if identification commences from angle $R_5$, blocks 35, 40, 42 and 44 detect the SSSS seqeunce, which is not identified by block 46 or even by block 51 with the addition of a further S signal detected by block 49, whereas block 54 identifies the SSSC sequence which, via block 47, presets counter 122 to output 1. The same SSSC sequence is identified by block 51 or 46, depending on whether identification commences from angle $R_6$ or $R_7$ respectively, and the same block 47 activated for presetting counter 122 to output 1.

As shown in FIG. 5h, if identification commences from angle $R_8$, blocks 35, 40, 42 and 44 detect an SSCS signal sequence not identified by block 46, and blocks 49 and 52 cause further S and C signals to be detected until the sequence of the last four signals (CSSC) is identified by block 54 which, via block 47, causes counter 122 to be preset to output 4. The said preset output 4 is controlled by block 51 or 46, which detect the same last four-signal sequence (CSSC) starting from identification angles $R_9$ or $R_{10}$ respectively.

Subsequent to stroke identification of engine 101, counter 122, the output of which is increased one unit for each incoming signal from sensor 103 or 105, and to which microprocessor 121 may assign the respective numbers listed vertically in FIG. 5d and relative to the specific stroke condition of each cylinder, provides for performing each specific memorised routine controlling supply to injectors 116 and ignition by unit 120.

In normal operating mode subsequent to stroke identification, microprocessor 121 also checks the accuracy of the sequence of signals received from sensors 103 and 105. As shown in FIG. 4, microprocessor 121 goes on to a block 57 for detecting recepiton of each incoming signal from sensor 103 or 105. When an incoming signal is received, block 57 goes on to block 58 which increases the output of counter 122 by one unit and goes on to block 59 which, like block 39 in FIG. 3, shifts the previous figures leftwards and enters, in the least significant right-hand position of memory register 123, a 0 or a 1, depending on whether the signal detected by block 57 is from sensor 105 or 103. Block 59 then goes on to block 60 which compares the content of the said updatable register 123 with that of memory register 124, in the cell addressed by the current output of counter 122. The said register 124 has ten cells addressed by numbers 0 to 9 and in which are memorised the same signal sequences storable in memory register 123 subsequent to progressive reception of the signals from sensors 103 to 105. Table 3 shows the memorised content relative to each cell number;

TABLE 3

| 0 | 1 |
|---|---|
| 1 | 10 |
| 2 | 101 |
| 3 | 1011 |
| 4 | 10110 |
| 5 | 101101 |
| 6 | 1011011 |
| 7 | 10110111 |
| 8 | 101101111 |
| 9 | 1011011111 |

It should be pointed out that, upon identification of a memorised sequence, block 47 in FIG. 3, in addition to presetting the output of counter 122 as described, also presets the content of memory rgister 123 to the sequence shown in Table 3. Block 60 then goes on to block 61 which, in the case of a positive match between the content of register 123 and the specific cell in register 124, enables continued performance of the routines on microprocessor 121. In the case of a negative match, however, indicating an incorrect signal sequence from control unit 102, block 61 goes back to block 35 in FIG. 3 for further stroke identification of engine 101.

The advantages of the internal combustion engine stroke identification system according to the present invention will be clear from the foregoing description. In particular, it provides for using only one sensor 105 cooperating with disc 32 secured to the shaft of distribution 126, which, in turn, provides for low-cost manufacture and assembly, eliminating interference and fase signaling between pairs of sensors, and, more importantly, for considerably reducing identification time, even with only one sensor 105, such identification time never exceeding the reception of six consecutive signals from sensor 103 or 105, regardless of the starting angle of the drive shaft on engine 101.

To those skilled in the art it will be clear that changes may be made to the embodiment described herein of the identification system according to the present invention, without, however, departing from the scope of the same.

What is claimed is:

1. A system for identifying the strokes, (I, C, E, Ex) on an internal combustion engine (101), said system comprising first sensor means (103) for detecting given angles of a drive shaft (125), second sensor means (105) for deteting given angles of a distributor (126) shaft, said distributor shaft rotating at a speed equal to one half the rotational speed of the drive shaft, and processing means (102) for receiving signals (S, C) from said first (103) and said second (105) sensor means, means for converting said received signals (S, C) into digital signals, and means for identifying the strokes (I, C, E, Ex) on the said engine (101) by comparing said digital signals with preset stored values, characterised by the fact that said second sensor means comprise a single sensor element (105),
  wherein said second sensor element (105) is positioned for detecting subsequent passage of two portions (33) of an element (32) secured to said distributor (126) shaft, and
  wherein said two portions (33) are spaced 90° apart, and that said second sensor element (105) is positioned so as to generate its respective signal (C) substantially in the center portion of the interval between the signals (S) from the said first sensor means (103).

2. A system for identifying the strokes (I, C, E, Ex) on an internal combustion engine (101), said system comprising first sensor means (103) for detecting given angles of a drive shaft (125), second sensor means (105) for detecting given angles of a distributor (126) shaft, said distributor shaft rotating at a speed equal to one half the rotational speed of the drive shaft, and processing means (102) for receiving signals (S, C) from said first (103) and said second (105) sensor means, means for converting said received signals (S, C) into digital signals, and means for identifying the strokes (I, C, E, Ex) on the said engine (101) by comparing said digital signals with preset stored values, characterised by the fact that said second sensor means comprise a single sensor element (105),
  wherein said processing means comprises means (35, 40, 42, 44, 49, 52) designed to detect reception of a number of consecutive signals from said first (103) and said second (105) sensor means, and means (46, 51, 54) designed to identify given sequences of the said signals (S, C) and, in the case of positive identification, to generate a signal identifying the stroke on the engine, and, in the case of negative identification, to continue detecting subsequent signals (S, C) from said first and said second sensor means, for the purpose of identifying a given signal sequence,
  wherein the given sequences of the said signals from said first and second sensor means (103, 105) comprise, in succession, a signal (C) from said second sensor means (105), two signals (S) from said first sensor means (103) and a further signal (C) from said second means (105).

3. A system for identifying the strokes (I, C, E, Ex) on an internal combustion engine (101), said system comprising first sensor means (103) for detecting given angles of a drive shaft (125), second sensor means (105) for detecting given angles of a distributor (126) shaft, said distributor shaft rotating at a speed equal to one half the rotational speed of the drive shaft, and processing means (102) for receiving signals (S, C) from said first (103) and said second (105) sensor means, means for converting said received signals (S, C) into digital signals, and means for identifying the strokes (I, C, E, Ex) on the said engine (101) by comparing said digital signals with preset stored values, characterised by the fact that said second sensor means comprise a single sensor element (105),
  wherein said processing means comprises means (35, 40, 42, 44, 49, 52) designed to detect reception of a number of consecutive signals from said first (103) and said second (105) sensor means, and means (46, 51, 54) designed to identify given sequences of the said signals (S, C) and, in the case of positive identification, to generate a signal identifying the stroke on the engine, and, in the case of negative identification, to continue detecting subsequent signals (S, C) from said first and said second sensor means, for the purpose of identifying a given signal sequence,
  wherein the given sequences of the said signals from said first and second sensor means (103, 105) comprise, in succession, a signal (C) from said second sensor means (105) and three signals (S) from said first sensor means (103).

4. A system for identifying the strokes (I, C, E, Ex) on an internal combustion engine (101), said system comprising first sensor means (103) for detecting given angles of a drive shaft (125), second sensor means (105) for detecting given angles of a distributor (126) shaft, said distributor shaft rotating at a speed equal to one half the rotational speed of the drive shaft, and processing means (102) for receiving signals (S, C) from said first (103) and said second (105) sensor means, means for converting said received signals (S, C) into digital signals, and means for identifying the strokes (I, C, E, Ex) on the said engine (101) by comparing said digital signals with preset stored values, characterised by the fact that said second sensor means comprise a single sensor element (105),
  wherein said processing means comprises means (35, 40, 42, 44, 49, 52) designed to detect reception of a number of consecutive signals from said first (103) and said second (105) sensor means, and means (46, 51, 54) designed to identify given sequences of the said signals (S, C) and, in the case of positive identification, to generate a signal identifying the stroke on the engine, and, in the case of negative identification, to continue detecting subsequent signals (S, C) from said first and said second sensor means, for the purpose of identifying a given signal sequence,
  wherein the given sequences of the said signals from said first and second sensor means (103, 105) comprise, in succession, three signals (S) from said first sensor means (103) and a signal (C) from said second sensor means (105).

5. A system for identifying the strokes (I, C, E, Ex) on an internal combustion engine (101), said system comprising first sensor means (103) for detecting given angles of a drive shaft (125), second sensor means (105) for detecting given angles of a distributor (126) shaft, said distributor shaft rotating at a speed equal to one half the rotational speed of the drive shaft, and processing means (102) for receiving signals (S, C) from said first (103) and said second (105) sensor means, means for converting said received signals (S, C) into digital signals, and means for identifying the strokes (I, C, E, Ex) on the said engine (101) by comparing said digital signals with preset stored values, characterised by the fact that said second sensor means comprise a single sensor element (105),
  wherein said processing means comprises means (35, 40, 42, 44, 49, 52) designed to detect reception of a number of consecutive signals from said first (103) and said second (105) sensor means, and means (46, 51, 54) designed to identify given sequences of the said signals (S, C) and, in the case of positive identification, to generate a signal identifying the stroke on the engine, and, in the case of negative identification, to continue detecting subsequent signals (S, C) from said first and said second sensor means, for the purpose of identifying a given signal sequence,
  wherein the given sequences of the said signals from said first and second sensor means (103, 105) comprise, in succession, six signals (S) from said first sensor means (103).

6. A system as claimed in claim 1, characterised by the fact that said processing means (102) comprise means (46, 51, 54) for identifying the stroke on the engine (101) within a maximum of six signals (S, C) received from said first (103) and said second (105) sensor means.

7. A system as claimed in claim 1, characterised by the fact that said processing means comprises means (35, 40, 42, 44, 49, 52) designed to detect reception of a number of consecutive signals from said first (103) and said second (105) sensor means, and means (46, 51, 54) designed to identify given sequences of the said signals (S, C) and, in the case of positive identification, to generate a signal identifying the stroke on the engine, and in the case of negative identification, to continue detecting subsequent signals (S, C) from said first and said second sensor means, for the purpose of identifying a given signal sequence.

8. A system as claimed in claim 7, characterised by the fact that the given sequences of the said signals from said first and second sensor means (103, 105) comprise, in succession, a signal (C) from said second sensor means (105), two signals (S) from said first sensor means (103) and a further signal (C) from said second means (105).

9. A system as claimed in claim 7, characterised by the fact that, in the case of positive identification, the identification means preset, to a value depending on the type of the said identified sequence, a counter (122) supplies a signal indicating the strokes (I, C, E, Ex) of the said engine (101), the content of said counter (122) being updated upon reception of each signal (S, C) from the said first (103) or second (105) sensor means, and said counter being zeroed upon each repetition of the signal cycle from said first and second sensor means (103, 105).

10. A system as claimed in claim 1, characterised by the fact that said processing means (102) also comprise means (60, 61) for checking the correctness of the sequence of signals (S, C) receved from said first and second sensor means (103, 105), even subsequent to stroke identification of the engine.

11. A system as claimed in claim 10, characterised by the fact that said means for detecting said signals from the said first (103) and second (105) sensor means update the content of a register (123), said content differing according to whether said signal is generated by said first (103) or said second (105) sensor means, and said register (123) being zeroed upon each repetition of the signal cycle from said first and second sensor means (103, 105), and characterised by the fact that said checking means comprise means (60, 61) for comparing the content of said register (123) with that of a respective cell on memory means (124) addressed by the output of said counter (122), said comparing means (60, 61), in the event of a negative comparison, controlling further stroke identification of the engine (101) via said processing means (102).

12. A system as claimed in claim 1, characterised by the fact that it is applied to a sequential, timed electronic injection system for the engine.

13. A system as claimed in claim 7, characterised by the fact that the given sequences of the said signals from said first and second sensor means (103, 105) comprise, in succession, a signal (C) from said second sensor means (105) and three signals (S) from said first sensor means (103).

14. A system as claimed in claim 7, characterised by the fact that the given sequences of the said signals from said first and second sensor means (103, 105) comprise, in succession, three signals (S) from said first sensor means (103) and a signal (C) from said second sensor means (105).

15. A system as claimed in claim 7, characterised by the fact that the given sequences of the said signals from said first and secnd sensor means (103, 105) comprise, in succession, six signals (S) from said first sensor means (103).

* * * * *